May 31, 1960 — O. A. KERSHNER — 2,938,608
DISC BRAKE HAVING COMBINED FRICTION
AND SEGMENTAL ACTUATING MEANS
Filed April 17, 1959
FIG. 1.
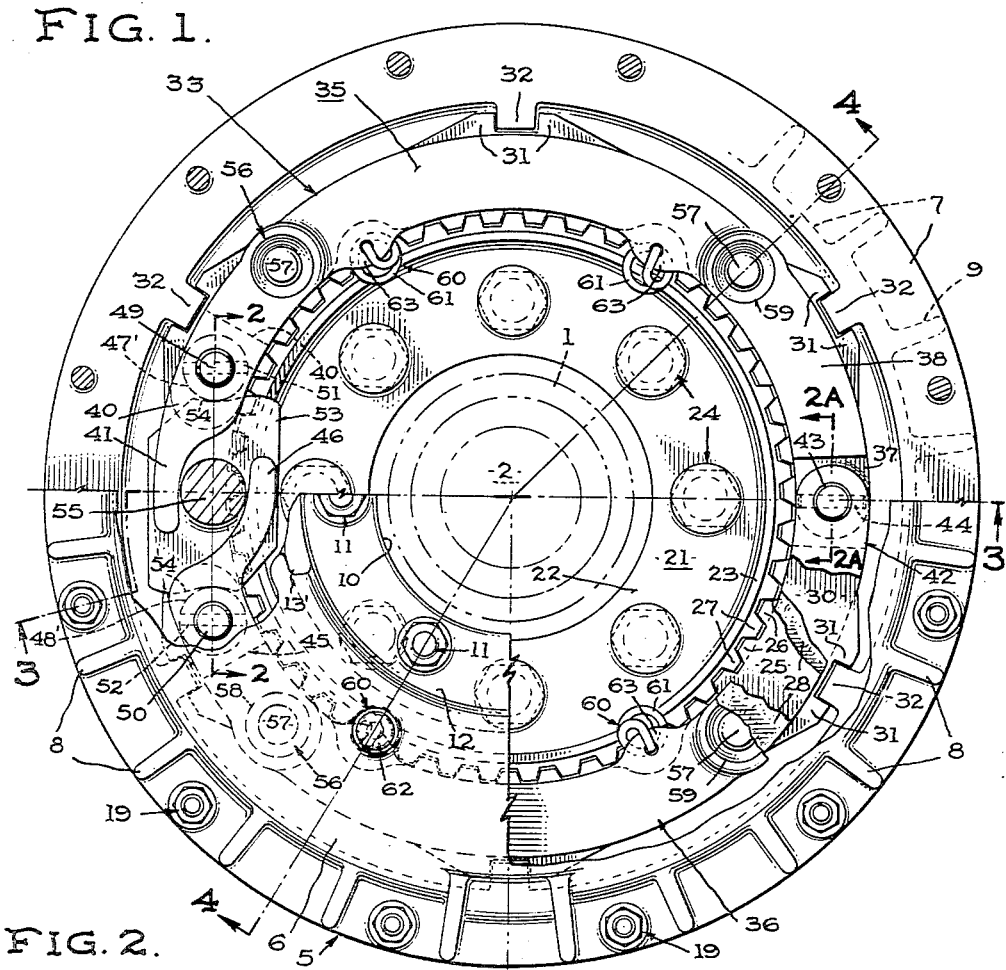
FIG. 2.
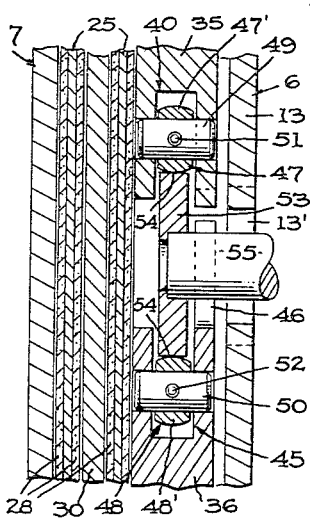
FIG. 1A.
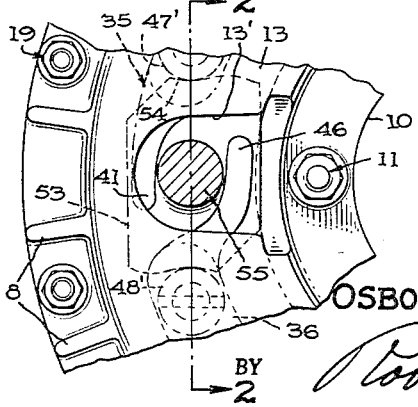
FIG. 2A.
INVENTOR
OSBORN A. KERSHNER
BY
ATTORNEYS

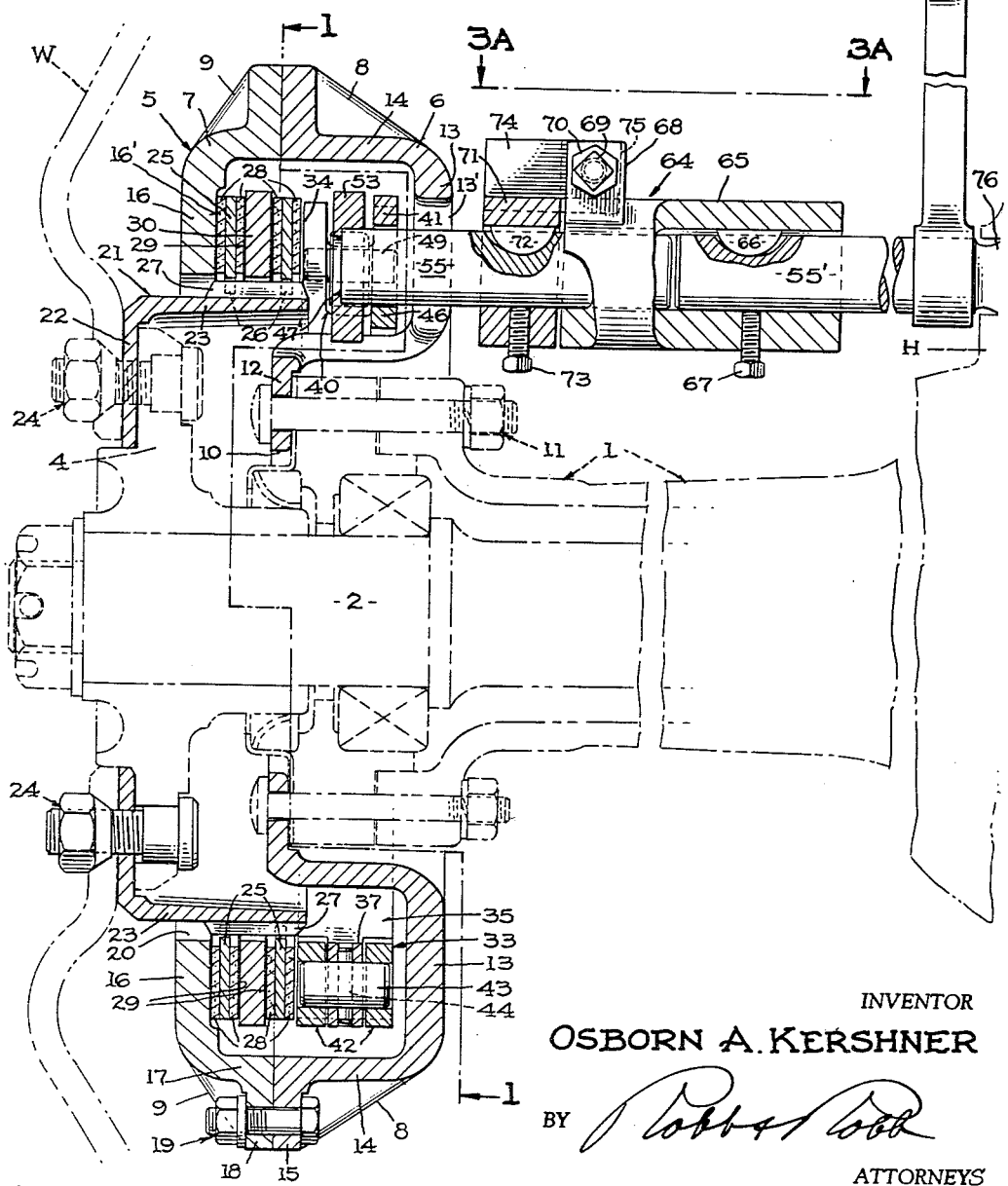

INVENTOR
OSBORN A KERSHNER

May 31, 1960
O. A. KERSHNER
2,938,608
DISC BRAKE HAVING COMBINED FRICTION
AND SEGMENTAL ACTUATING MEANS
Filed April 17, 1959
6 Sheets-Sheet 4
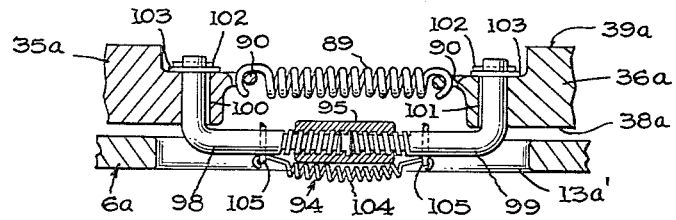
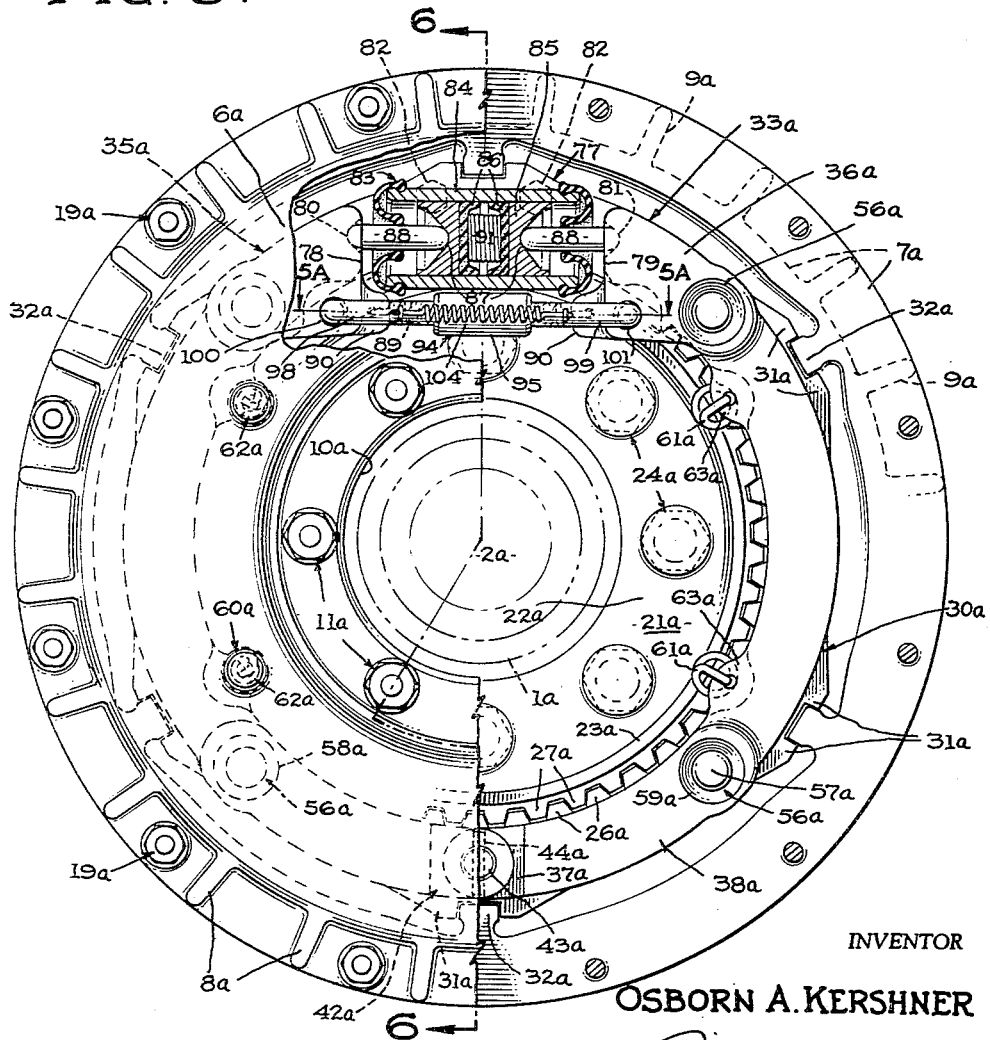
INVENTOR
OSBORN A. KERSHNER
BY
ATTORNEYS

INVENTOR
OSBORN A. KERSHNER

May 31, 1960 O. A. KERSHNER 2,938,608
DISC BRAKE HAVING COMBINED FRICTION
AND SEGMENTAL ACTUATING MEANS
Filed April 17, 1959 6 Sheets-Sheet 6

INVENTOR
OSBORN A. KERSHNER
BY
ATTORNEYS

United States Patent Office 2,938,608
Patented May 31, 1960

2,938,608

DISC BRAKE HAVING COMBINED FRICTION AND SEGMENTAL ACTUATING MEANS

Osborn A. Kershner, St. Joseph, Mich., assignor, by mesne assignments, to Lambert Brake Corporation, St. Joseph, Mich., a corporation of Michigan Filed Apr. 17, 1959, Ser. No. 807,127

20 Claims. (Cl. 188—72)

The present invention relates to friction devices in the nature of disc brakes and disc clutches, and more particularly to disc brakes having novel means for mechanically and hydraulically effecting actuation of the brake.

One object of the present invention is to provide an improved self-energizing or servo type disc brake which is adaptable for association with a vehicle wheel, and more principally with the traction or driving wheels of conventional farm tractors for braking movement of said vehicle and for aiding in the steering thereof where separately operable.

Another object is to provide a very compact novel brake as aforesaid which is adaptable for installation on farm tractor drive wheels under the normal but often quite limited allowable space conditions, wherein both the mechanical actuating linkage of a mechanically actuated embodiment or the hydraulic actuating means of a hydraulically actuated embodiment are located within the interior of the brake housing, thus affording a symmetrical arrangement which is more adaptable to wheel contours.

Specifically, one object is to provide a novel annular actuator disc assembly which comprises complementary semi-circular disc segments pivotally connected at one end and having cam operating means operably interposed between and at the non-pivoted ends of said actuating disc segments, and which utilizes a maximum mechanical advantage of said cam actuating means.

A further object is to provide a novel mechanical means for operating the aforesaid actuator disc segments, such operating means comprising a rockable actuator shaft and cam means for effecting opposite relative rotative movements of the disc segments responsive to rocking of said shaft, and the shaft being free to shift with the actuating disc assembly to permit a limited braking torque-responsive rotation or "clocking" of the disc segments.

Still another object is to provide a mechanically actuated disc brake as aforesaid, which can be manually adjusted to compensate for wear of friction lining material.

Yet another object is to provide a novel hydraulically operated disc brake utilizing a split pivoted actuating disc assembly in combination with a single double-acting hydraulic cylinder for use on farm tractors or other vehicles having a source of hydraulic pressure fluid for operating said brake, and said brake also having means for automatically adjusting the same responsive to wear of the friction lining material with which such brakes are usually provided.

A still further object is to provide a novel mechanically or hydraulically operated disc brake which is readily adaptable for uses other than on vehicle wheels, such as for use in retarding rotative movements of countershafts and the like.

And still another important object is to provide an improved servo disc brake as aforesaid which utilizes a common actuating and servo camming means during brake operation.

Other objects and advantages will be hereinafter described or will become apparent to those skilled in the art, and the novel features thereof defined in the appended claims.

In the drawings:

Fig. 1 is one illustrative form of a mechanically actuated brake according to my invention, as applied to a drive axle of a tractor vehicle, with the tractor wheel omitted, the axle and axle housing being shown in broken outline, and the housing broken away to better disclose the interior construction of the brake assembly and with a part of one of the actuating disc segments broken away to better disclose the disc details and relationships, this view being taken substantially on line 1—1 of Fig. 3;

Fig. 1A is a fragmentary inboard elevation view of the brake of Fig. 1, showing the clearance opening in the inboard housing member for the actuator cam means and its rockable actuator shaft which is shown in cross-section;

Fig. 2 is a fragmentary vertical cross-sectional view through the actuator cam means and related brake structure, as seen on line 2—2 of Figs. 1 and 1A;

Fig. 2A is a fragmentary vertical cross-sectional view through the pivoted connection of the actuator disc segments as seen on line 2A—2A of Fig. 1;

Fig. 3 is a view in section and on a slightly enlarged scale, as taken on line 3—3 of Fig. 1, and also showing partly in elevation and partly in cross-section one form of lining wear adjustment or take-up means as adapted to the actuator cam shaft;

Fig. 3A is a view in elevation of the lining wear-adjustment means as viewed on line 3A—3A of Fig. 3;

Fig. 5 is a view similar to Fig. 1, but relating to a modified and hydraulically actuated embodiment of the brake, showing the hydraulic actuator means in cross-section and as viewed substantially on line 5—5 of Fig. 6;

Fig. 5A is a fragmentary sectional view of the self-adjuster means as taken substantially on line 5A—5A of Fig. 5, but with some of the parts being shown in full elevation;

Like reference characters in the several figures of the drawings and in the following description designate corresponding parts.

As aforementioned, the brake of this invention is particularly adaptable for association with the axle housing and drive axle of a conventional farm tractor, and the following description is exemplary of such a structure wherein an axle housing 1 of a conventional farm tractor is shown in broken lines containing a drive axle 2, also shown in broken lines, which is driven from a suitable power transmission source (not shown) of the tractor vehicle. The axle 2 projects outwardly through a radially flanged bearing support means 3 (better seen in Figs. 3 and 4) of the axle housing 1, and on the outer extremity of said axle, there is provided an apertured flanged wheel mounting hub 4, also shown in broken outline.

Figure 4:
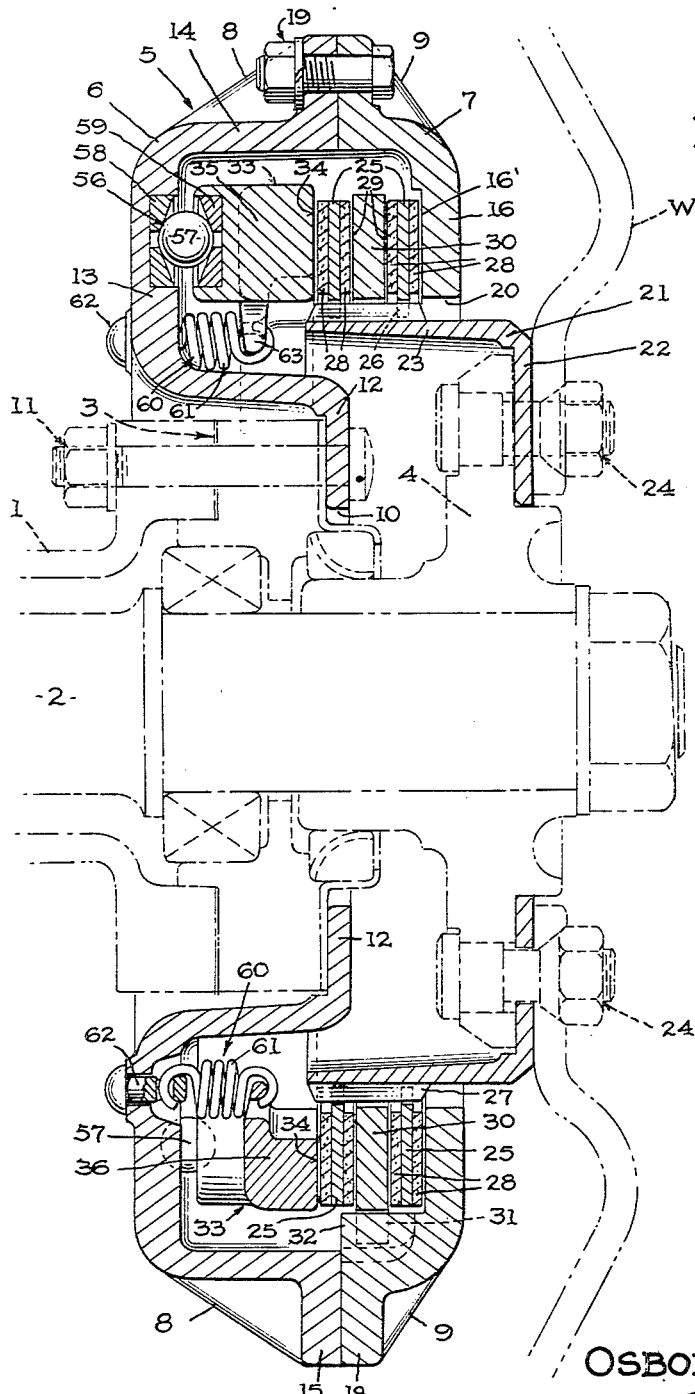
Fig. 4 is a view in cross-section and on a slightly enlarged scale, as taken on line 4—4 of Fig. 1, and more clearly disclosing the details of the actuator disc assembly mounting, as well as other brake components.

Illustrative of one mechanically operated brake embodiment, the brake includes a two-part hollow brake housing generally designated at 5 and comprising an inboard brake housing member 6, and an outboard housing member 7, each member being provided with the usual plurality of air-cooling ribs 8 and 9 respectively. The inboard brake housing member 6 is provided with a central opening 10 therethrough to facilitate mounting about the axle bearing support means 3, and is preferably removably secured thereto and to the outboard end of the axle housing 1, as by means of a plurality of bolt, washer and nut assemblies 11. The central portion 12 of the inboard housing section 6 preferably is axially offset in an outward direction, whereby the main body of the housing member 6 is disposed in closely adjacent relationship to the axle housing 1 as best seen in Figs. 3 and 4.

In addition, inboard housing member 6 is provided with a radially extended wall 13 having a clearance opening 13', said opening being generally bell-shaped, as viewed in Fig. 1A, and providing an operating clearance for a rockable actuator cam and shaft which will be hereinafter described in detail. Housing member 6 is also provided with an outwardly disposed axially extended marginal wall 14 which terminates in a radially extended apertured flange 15 which is adapted to mate with a similar complemental flange on the outboard housing member 7.

The outboard housing member 7 has a radially extended wall 16 disposed in opposed spaced relation to wall 13 of inboard housing section 6, and also has an outwardly disposed axially extended marginal wall 17 which terminates in a radially extended apertured flange 18. Said flange 18 is complementary to and removably secured to flange 15 of housing section 6 as by means of a plurality of bolt, washer and nut assemblies 19.

The radial wall 16 of outboard housing member 7 has a relatively large central opening 20 therethrough and a rotary brake disc-supporting and drive hub member 21 having a radially disposed wall 22 and an axially extended marginal splined flange 23, is disposed within the central opening 20 in outboard housing section 6, with the marginal flange 23 projecting centrally into the housing 5. The wall 22 of the drive hub member 21 is apertured to correspond with and to be suitably secured to the flanged wheel mounting hub 4 on which a tractor wheel W (shown in fragmentary broken outline) is mounted, as by a plurality of bolt and nut assemblies 24.

Accordingly, there is provided a fixed hollow brake housing 5 and a rotatable splined disc-supporting hub 21 disposed within the housing, said housing being provided with opposed axially spaced and radially extended walls, one of which (preferably the outboard housing wall 16) is provided with a flat annular friction face 16' interiorly thereof for frictional engagement with a friction disc assembly which will now be described.

The friction disc assembly preferably comprises a pair of friction discs 25, 25 of annular form, and each having their inner peripheries splined as at 26 for complemental engagement with mating splines 227 which are formed on the outer periphery of drive hub 21 when slidably mounted thereon. It is to be noted that discs 25, 25 are free for axially shiftable movements on hub 21 while being positively connected thereto for rotation therewith; and, although said discs preferably are identical, one is axially located thereon in a generally outboard position, while the other is spaced inboard thereof, the significance of this arrangement to become more apparent from the following description. Each disc 25 is provided on its opposite faces with suitable friction lining material 28, certain of said lined faces being adapted for frictional engagement with a pair of friction surfaces 29, 29 of an annular stator disc 30 which is disposed intermediate said friction discs 25, 25.

The stator or intermediate disc 30 is provided with a plurality of circumferentially spaced, radially slotted mounting lugs or ears 31 which respectively engage with several complemental stationary anchoring lugs 32 on the fixed outboard housing section 7 for precluding rotation of disc 30, but which permit free axially shiftable movements of disc 30 on lugs 32 during braking operations.

The outermost lining material 28 of the outboard friction disc 25 is disposed for engagement with friction face 16' of the outboard housing section 7, while the innermost lining material of the inboard friction disc 25 is disposed for engagement with a novel annular actuator friction disc assembly 33, and more particularly, with the friction face thereof generally denoted as 34 and better seen in Figs. 3 and 4.

The annular actuator friction disc assembly 33 comprises a pair of complemental semi-circular disc segments 35 and 36. These segments are disposed in a common plane in such a manner as to form substantially a single annular actuator disc which is diametrically split but pivotally joined together at one side thereof, with the opposed side having the respective free ends of the segments operatively engaging a shaft-supported, double-acting, rockable cam member which is disposed therebetween.

More specifically, the actuator disc segment 35, which will be referred to as the upper disc segment, is provided at the end which is pivotally joined to the segment 36 with a generally flat, apertured tongue 37 which lies medially of the adjacent opposite side faces 38 and 39 of the disc segment 35, as best seen in Fig. 2A. The other end of actuator disc segment 35 is in the form of a clevis 40 and has a projecting finger 41 which extends circumferentially along the outer periphery of segment 35 as shown in Fig. 1.

Referring now to complemental disc segment 36, which will be referred to as the lower segment, it is constructed much the same as upper segment 35, but, at the end which pivotally connects with segment 35, it is provided with a clevis 42 which cooperates with apertured tongue 37 of segment 35 and is pivotally secured thereto by means of clevis pivot pin 43. Said pivot pin 43 is, in turn, secured in place by a diametrically inserted lock pin 44. The other free end of lower segment 36 is also in the form of a clevis 45, corresponding to the clevis 40 on the upper segment 35, and also has a projecting finger 46, corresponding and complementary to finger 41 of upper actuator segment 35. However, said finger 46 is disposed to extend circumferentially along and radially inwardly spaced from the inner periphery of segment 36, as better seen in Fig. 1.

Within each clevis 40 and 45 of the respective free ends of actuator segments 35 and 36, there is provided as part of the actuator means, anti-friction cam roller assemblies 47 and 48, respectively. Said assemblies 47 and 48 comprise rollers 47' and 48' which are fixed on rotatable mounting or clevis pins 49 and 50, respectively. The cam rollers 47' and 48' and their respective mounting pins 49 and 50 are locked together by transversely inserted lock pins 51 and 52, respectively, and disposed in a freely rotatable manner that axially centers said mounting pins, which are of lesser length than the thickness of the clevis portion of their respective actuator segments, and thus assuring free rotation thereof within the slotted confines or clevised portions of the actuator segments 35 and 36.

In assembly, the rollers 47' and 48' operatively engage against a rockable operator head in the form of a double-acting cam member 53, and more particularly against the opposed arcuate camming portions 54, 54 thereof. Cam member 53 is actuated by a rockable mounting shaft 55 which is secured centrally of and projects substantially perpendicularly from said member 53 in an inboard direction. Shaft 55 and cam member 53 are aided in being retained in their proper positions relative to the actuating disc segments by means of the aforementioned fingers 41 and 46, respectively, which lightly straddle actuator shaft 55. The fingers 41 and 46 are so designed and the actuator disc so assembled as to permit said actuator segments 35 and 36 to move in a combined rotative and radially opposite and radially outward direction responsive to rocking movements imparted to cam member 53.

Actuating disc segments 35 and 36 are suitably provided with a plurality of circumferentially spaced self-energizing or servo camming means designated generally at 56, each of which preferably comprises a hardened steel camming ball 57 disposed between a pair of complementary conically dished camming inserts 58 and 59 (as best seen in Fig. 4), and which are carried in suitable counterbores within wall 13 of inboard housing member 6 and within the actuator segments, respectively. Wall 13 of the inboard housing member also acts as a pressure plate during actuation and energization of the brake. It becomes apparent that the above-mentioned camming means 56, in addition to serving the dual or common functions of actuating and energizing the brake, also serve as piloting means for the actuator disc assembly 33, and the actuator disc assembly 33 is floatingly maintained in the proper axial relationship to inboard housing member 6 by means of a plurality of circumferentially spaced return spring assemblies 60. The return spring assemblies, which afford proper release clearance for the brake components, each comprise a return spring 61 and an anchor pin 62 which secures spring 61 to the inboard housing section 6. Each return spring 61 is attached at its other end to an apertured ear 63 which preferably is an integral part of each actuator disc segment.

Actuator cam shaft 55 projects preferably only a relatively short distance exteriorly of brake housing 5 in an axially inboard direction, where it aligns and connects with a brake operating pedal shaft 55'. Pedal shaft 55' is rotatively secured to the axle and transmission housing H and has a brake pedal means P attached to one end in any suitable manner.

Shafts 55 and 55' are operatively connected together by means of an elongated connector collar or sleeve 65 which is a part of the manual adjuster means designated generally at 64, as seen in Figs. 3 and 3A. More specifically, the adjuster means 64 includes the connector sleeve 65 which may be considered a driving collar and which is keyed at 66 to the embraced end of pedal shaft 55' which, in turn, abuts the projecting end of actuator shaft 55, with said driving collar or sleeve 65 also being secured to shaft 55' by a set screw 67. Key 66 assures that positive rotary driving movement is imparted to sleeve 65 from pedal shaft 55', while setscrew 67 is intended to prevent relative axial displacement of shaft 55' and sleeve 65. Sleeve 65 freely but closely extends about the free end of shaft 55 far enough to assure proper operative alignment of said shafts, and has affixed on its outer end an outstanding boss or driving lug 68 which is provided with an aperture threaded transversely to the axis of sleeve 65 to receive and carry an adjusting drive screw 69, with an associated lock nut 70 on said screw 69. The adjuster means 64 further includes a similar, but shorter, collar 71, which may be considered as the driven collar and which is secured by a key 72 and setscrew 73 intermediate the ends of actuator shaft 55, in a similar manner as and adjacent to the outer end of sleeve 65. An adjuster screw abutment and drive lug 74 is affixed to the driven collar 71 and projects axially therebeyond to closely overlie sleeve 65 adjacent to driving lug 68, as indicated at 75 in Figs. 3 and 3A.

Accordingly, there is provided a very compact and efficient operative brake structure and adjusting means therefor, the operation of which will now be summarized.

Responsive to actuation of foot pedal P, pedal shaft 55' rotatively imparts rotation to actuator shaft 55 through connector means 64, and, in turn, effects a rocking movement of the actuator cam member 53. Cam rollers 47' and 48' roll on the opposed arcuate cam peripheries 54, 54 of member 53, causing actuating disc segments 35 and 36 to oppositely spread about pivot pin 43 which hinges them together. This spreading action causes the servo balls 57 to climb up their respective sets of ramped inserts 58 and 59 with the housing wall 13 acting as a pressure plate. This action effects the take-up of the normal running clearance of the brake by causing the actuating disc assembly 33 to move axially, against the pull of return springs 61, into contact with the lining of adjacent rotary friction disc 25. Said friction disc 25 is, in turn, forced into contact with intermediate stator disc 30, which moves axially to press the outboard friction disc 25 against friction surface 16' of the outer housing member 7. Normal self-energization occurs when the drag torque of the rotary friction disc adjacent actuator disc assembly 33 is imparted to the latter, which causes it to "clock" in the direction of wheel rotation, this being permitted by the clearance opening 13' in the housing and the universal type of mounting of pedal shaft 55' in the transmission housing H as seen at 76 in Fig. 3. At this point, it should be noted that the arc of travel of the inserts 59 which are disposed further away from the pivot pin 43 of the actuating disc assembly, is greater than the arc of travel of those inserts which are closer to said pivot pin. Therefore, it is preferable that the ramp angle of those inserts 59 which are closer to pivot pin 43 be greater than that of those inserts which are farther away, in order to assure that the actuating disc assembly 33 moves axially in a uniform manner. However, tests have proven that actuation is successfully accomplished even though no compensation in the angles of the inserts is made. It is to be understood, however, in the latter instance, that the balls and ramps farther from pivot pin 43 perform a greater function in taking up the running clearance than the balls and inserts which are closer to said pin 43, while the latter-mentioned balls and inserts principally function to energize the brake. Further, it is to be noted that even when compensation in the ramp angles of the inserts is made, the balls and inserts closer to the pivot pin will still perform a greater function in energizing the brake than the others because of the steeper angle provided in said inserts.

As lining wear occurs, and the release clearance between the component parts increases, requiring noticeably further foot pedal travel, manual adjustment can be made by the adjuster means 64, as by simply loosening lock nut 70 and manually turning adjuster screw 69 further in its threaded support against the portion 75 of abutment lug 74. This causes actuator shaft 55 and cam member 53 to be rotated to the extent where the actuator disc segments 35 and 36 are spread further apart to cause balls 57 to cam the actuator disc assembly 33 closer to the friction discs until the desired release clearance is obtained, whereupon the lock nut 70 is again tightened.

Figure 6:
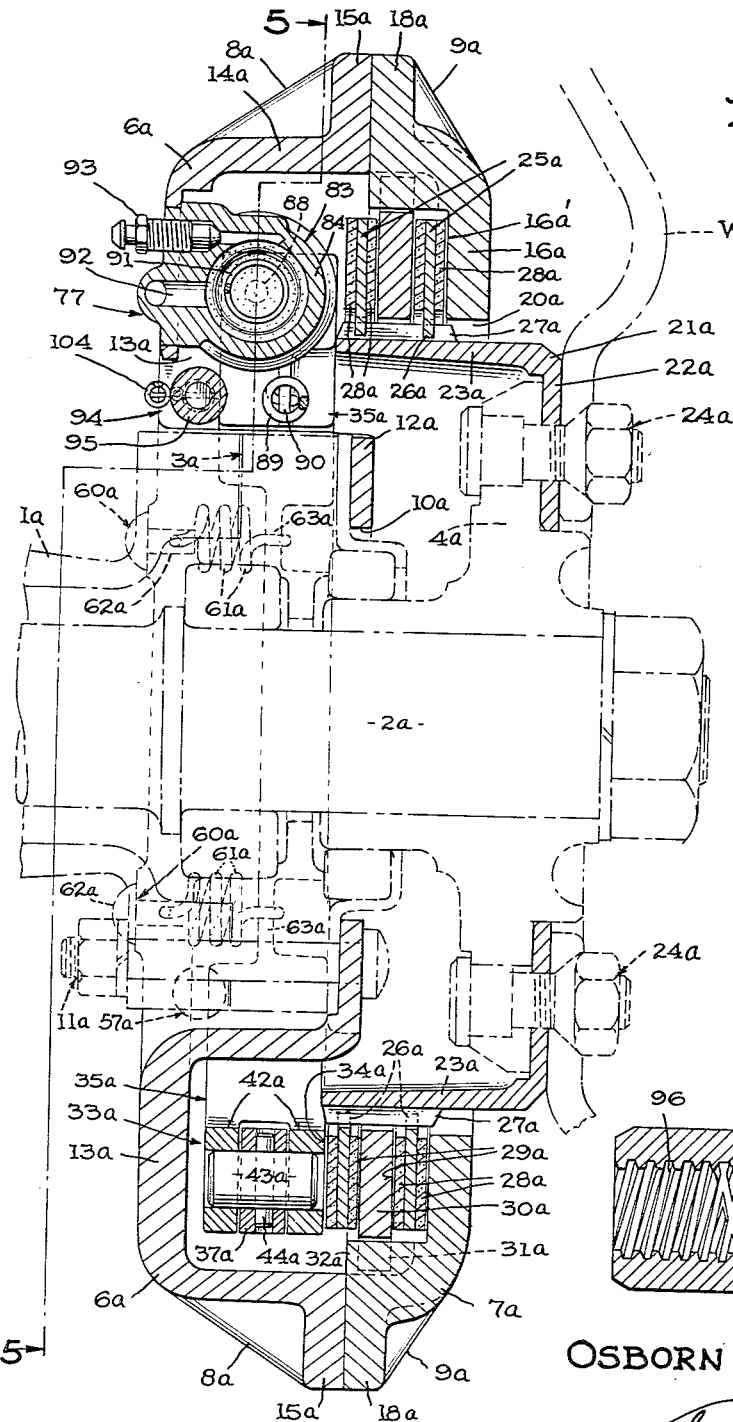
Fig. 6 is a transverse sectional view of the brake of Fig. 5 on a slightly enlarged scale and as seen substantially on line 6—6 of the latter.

Now referring to the hydraulically operated embodiment of my brake, which is illustrated in Figs. 5, 5A and 6, it will be noted that except for the elimination of the mechanical actuator means and slight changes in the free ends of the actuator disc segments for adaptation to the hydraulic actuator means, denoted generally at 77, the brake components are substantially identical to and have the same relationship as those already described in the foregoing, and accordingly are given the same reference numerals with a suffix "a" thereafter. Fig. 5 shows the actuator disc assembly 33a comprising a pair of similarly constructed and pivotally joined actuator disc segments 35a and 36a, the latter segments differing from segments 35 and 36 of the mechanically actuated embodiment in that the non-pivoted or free ends of the actuator segments 35a and 36a have a generally flat end face 78 and 79, respectively, disposed in spaced opposed relation, and are each provided with rounded complementary actuator thrust pin seats 80 and 81, respectively.

The hydraulic actuator means 77 is utilized in lieu of the mechanically operated linkage and actuator cam member 53 of the mechanically operated embodiment, and is secured to the inboard housing member 6a in any suitable manner, as by bolts 82, 82 which are shown in dotted outline in Fig. 5, due to the sectionalized illustration of said cylinder assembly.

Hydraulic actuator means 77 comprises a double-acting cylinder assembly 83 which includes a cylinder body 84 within which is disposed a pair of spaced pistons 85, 85, each having associated therewith a piston sealing cup 86 adjacent its flat innermost end face. The opposite end of each piston 85 is provided with a rounded thrust pin seat 87 within which one rounded end of a thrust pin 88 is rockably seated. The other rounded ends of thrust pins 88, 88 bear against their complementary seats 80 and 81, respectively, in the actuator disc segments 35a and 36a, under the yieldable contracting force of a return spring 89, better seen in Fig. 5a. Return spring 89 is secured to the disc segments 35a and 36a by means of an apertured ear 90 on each segment, with said ears being disposed in opposed complementary relation to each other. A compression spring 91 is preferably interposed between and seats within the sealing cups 86, 86 of pistons 85, 85 and serves to preclude return spring 89 from returning the actuator thrust pins and pistons too close together within cylinder 84 when the brake is in a released condition, as well as otherwise maintain their abutting relationship with the sealing cups aforesaid. Cylinder 84 is provided with the usual inlet passage 92 which directs a hydraulic actuating pressure fluid from a conventional source on the vehicle (not shown) into the interior of the cylinder between the actuator pistons 85, 85. A standard bleed valve 93 is also preferably provided in the cylinder 84.

This hydraulically actuated embodiment effects operation of the brake components in the same manner as the mechanically actuated form described in the foregoing, and therefore need not be fully repeated.

Briefly stated, as the pressure fluid is directed into the actuator cylinder 84 intermediate the pistons 85, 85, said pistons and respective thrust pins 88 are simultaneously forced oppositely apart, thus providing the double-action required to oppositely spread the actuator disc segments 35a and 36a. Upon actuation of the actuator disc assembly 33a, the rest of the operation of the brake is identical to that of the previously described mechanically actuated embodiment. However, inasmuch as the cylinder 84 of the hydraulic fluid motor or actuator means 77 is fixedly attached to the inboard housing member 6a, the "clocking" motion, which is imparted to the actuator disc assembly 33a by the drag torque of the adjacent rotary friction disc 25a, causes the thrust pins 88, 88, the pistons 85, 85, the piston cups 86, 86 and the spring 91 within cylinder 84 to shift together in the direction of the clocking motion according to the direction of rotation of the vehicle wheel.

As the hydraulic actuated embodiment is not susceptible to the incorporation of a similar manually operated lining wear adjustment means as provided in the first-described embodiment, there is preferably provided an automatic adjuster means generally designated at 94 which will now be described.

Figure 5B:
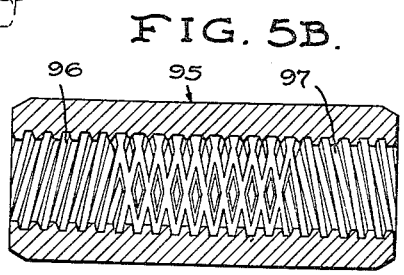
Fig. 5B is a longitudinal sectional detailed view through the adjuster sleeve of the hydraulic automatic adjuster means.

Automatic adjuster means 94 comprises a cylindrical adjusting nut or sleeve 95 which is internally provided with a multiple lead type of threaded bore throughout its axial center. The threaded bore includes both a left-hand thread 96 and a right-hand thread 97 which respectively extend inwardly from opposite ends of sleeve 95 and substantially overlap each other in the middle of said sleeve 95, as best seen in Fig. 5B. I-shaped adjusting screws 98 and 99 are provided on one end with complementary left-hand threads and right-hand threads of multiple lead type, respectively, and are correspondingly disposed within the adjusting sleeve 95, as best seen in Fig. 5A. One end of each of the adjuster screws 98 and 99 is attached to the actuator segments 35a and 36a, respectively, by laterally offsetting said screw ends and inserting them through slightly oversized holes 100 and 101 provided in said respective segments, the size of the holes being determined by the amount of normal running or release clearance desired. Cotter pins 102 and washers 103 are used to retain the adjuster screws loosely anchored in the actuator segments. A coiled spring 104 frictionally engages the outer periphery of and substantially spans the length of sleeve 95, with the ends of said spring 104 suitably attached to the adjuster screws 98 and 99, as by cotter pins 105. The purpose of the spring 104, which exerts less force than return spring 89 of the actuator disc segments, is to prevent undesired turning of the adjuster nut or sleeve 95 when not under axial thrust of either or both of the adjuster screws 98 and 99.

The principle of this automatic adjustment means is that, as lining wear occurs, the actuator disc segments 35a and 36a will simply remain in their outward pivotally spread position. This is because the pitch of the threads on the adjuster screws 98, 99 is sufficiently great to permit the adjuster sleeve 95 to rotate freely responsive to the spreading of the actuator disc segments which effects axial separation of the adjuster screws 98 and 99. As the actuator disc segments spread farther apart, the whole actuator assembly 33a is shifted axially toward the friction discs by the servo camming balls and inserts as described in the foregoing mechanical embodiment, thus taking up the normal running clearances therebetween. Since the adjuster screws automatically move apart, in turnbuckle-like fashion, responsive to the hydraulic actuation aforesaid, the pressure of which is sufficient to overcome the resistance of both the return spring 89 and spring 104, and because spring 104 is utilized to prevent retrograde movement of the adjuster screws within sleeve 95 upon release of the actuating fluid, the lining wear clearances are compensated for automatically.

Figure 8:
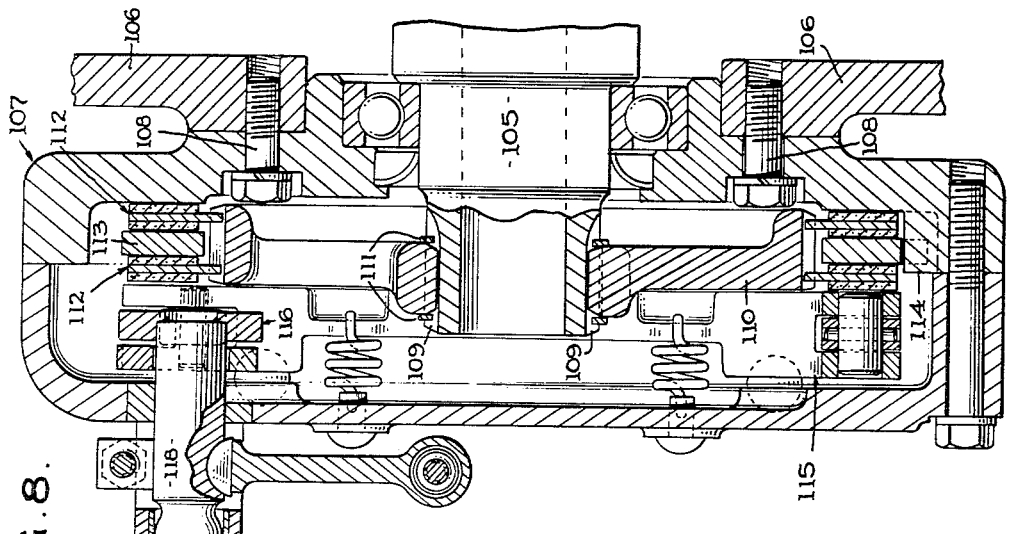
Fig. 8 is a view in transverse cross-section similar to Figs. 3, 4 and 6, and as viewed on line 8—8 of Fig. 7.
Figure 7:
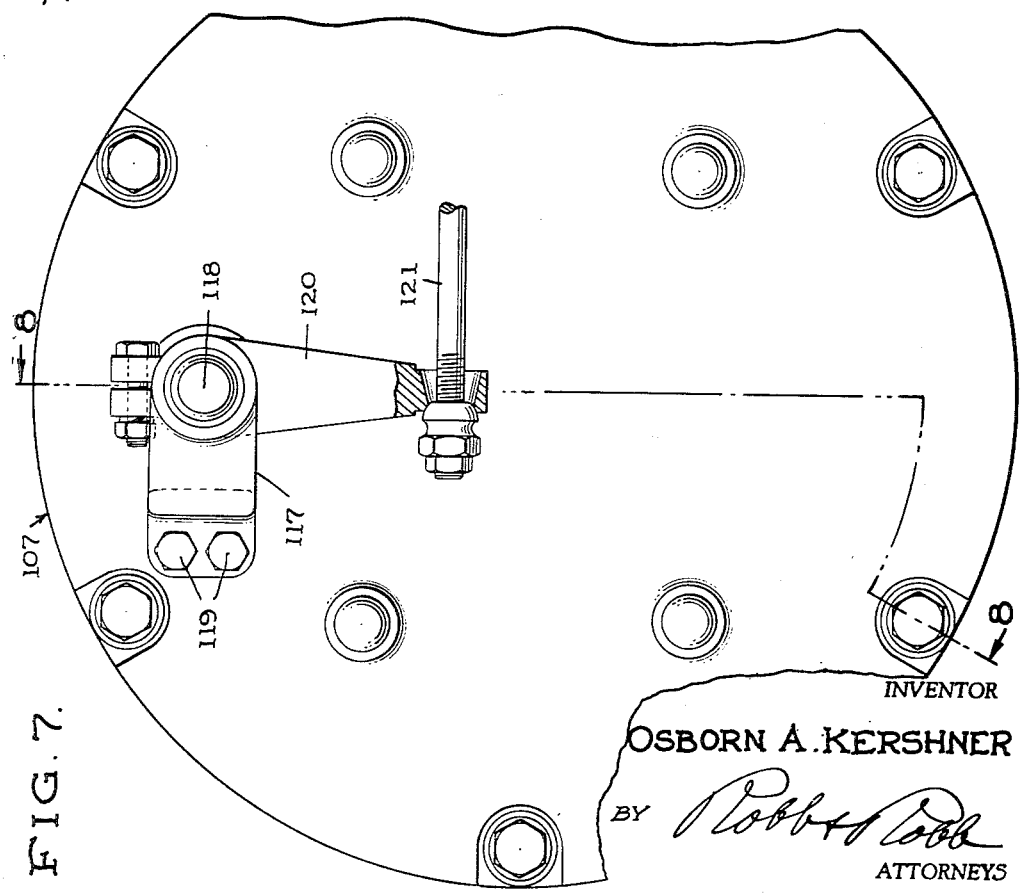
Fig. 7 is illustrative of an end elevational view of a brake assembly and operating linkage therefor as adapted to a rotary countershaft.

The brake and novel actuator means of this invention are readily adaptable to many uses other than for vehicle wheels, such as for installation on rotary countershafts, one such application being illustrated in Figs. 7 and 8 of the drawings. In this illustrative application, the brake friction disc means and actuator disc assembly are identical to those of the first described embodiment, and therefore the following description will be directed principally to the modified components as required for the application to a countershaft generally designated at 106. Said countershaft 106 is shown projecting from a transmission housing 106' or other mounting structure to which a two-part brake housing generally denoted 107 may be attached, as by screws 108. The shaft 106 is provided on its outwardly protruding end with a plurality of driving splines 109 upon which a complementally splined friction disc support and drive hub 110 is mounted. Suitable snap rings 111 are used to properly position the hub 110 on shaft 106. The outer periphery of hub 110 is also splined to support and drive axially shiftable and spaced rotary friction disc means 112, 112 which have disposed between them an intermediate stator disc 113. Stator disc 113 is also disposed for free axial movements on lugs 114 within the fixed brake housing 107 and which serve also to anchor said disc against rotation.

The actuator disc assembly 115 is identical to that of the first-described embodiment, and by referring back to Figs. 1–4, the complete details will be apparent. The actuator camming means 116 are also identical, with only a slight modification being made to provide a supporting bracket 117 on the brake housing 107 for pivotally and rotatably supporting the actuator cam shaft 118. Support 117 is secured to the outer brake housing member in any suitable manner, as by screws 119. An operating arm or link 120 has one end secured to actuator shaft 118, while the other end is adapted to receive a universally mounted connecting rod or pull link 121 which leads to and is connected with a conventional brake operator lever, not shown.

The operation of this brake adaptation will be fully apparent from the foregoing, since it is identical to the previously described mechanically operated embodiment, and therefore need not be again described.

From the foregoing detailed description, it will become apparent to those skilled in the art that the objects and advantages as set forth in the preamble hereof are fully attained by this invention and that the brake will work equally well regardless of the direction of rotation of the rotary member such as a wheel or countershaft to which it is applied.

While the specific details have been herein shown and described, other changes and alterations may be resorted to without departing from the spirit and scope thereof as defined in the appended claims.

I claim:

1. A friction device, comprising a hollow generally cylindrical housing having opposed axially spaced and radially extended annular end walls, friction means disposed within said housing, said friction means including at least one rotary annular friction disc and an actuator disc assembly coaxially disposed in adjacent parallel relation thereto, said friction disc and actuator disc assembly being axially shiftable relative to each other and to said housing, said actuator disc assembly comprising a pair of semi-circular disc segments disposed in a common plane in the form of a diametrically split annular disc, with the contiguous ends of said segments pivotally interconnected together at one side of said actuator disc assembly and with their opposite ends freely movable toward and away from each other incident to radially shiftable movements of the respective segments about the pivotal axis of their interconnected ends, camming means interposed between one of the radially extended end walls of the housing and the actuator disc assembly for axially shifting said actuator assembly and the rotary friction disc into cooperative frictional engagement with each other and effective upon the opposite radially extended housing end wall responsive to radially outwardly shifting movements of the actuator disc segments, and operating means disposed between the free ends of the actuator disc segments for imparting radial shifting movements to said latter segments.

2. A friction device as defined in claim 1, wherein the actuator disc assembly is piloted upon the camming means supported thereby within the housing for limited rotative movement responsive to drag torque imparted thereto by the rotary friction disc, and said actuator disc assembly also being axially movable responsive to the camming action of the cooperative camming means incident to such limited rotative movement of the actuator disc assembly as aforesaid.

3. A friction device as defined in claim 1, wherein the camming means between the housing end wall and the actuator disc assembly comprises a plurality of camming balls disposed in substantially equidistantly spaced relation to each other about the central axis of the housing and friction means and respectively confined between oppositely inclined camming surfaces on the respective opposed annular faces of the actuator disc segments and the adjacent end wall of the housing.

4. A friction device as defined in claim 1, wherein the camming means between the housing end wall and the actuator disc assembly comprises a plurality of camming balls disposed in substantially equidistantly spaced relation to each other about the central axis of the housing and friction means and respectively confined between oppositely inclined camming surfaces on the respective opposed annular faces of the actuator disc segments and the adjacent end wall of the housing, the inclination of the opposed camming surfaces being proportionately steeper the nearer the camming surfaces are to the pivotally connected ends of the actuator disc segments.

5. A friction device as defined in claim 1, wherein the camming means between the housing end wall and the actuator disc assembly comprises a plurality of camming balls disposed in substantially equidistantly spaced relation to each other about the central axis of the housing and friction means and respectively confined between oppositely inclined camming surfaces on the respective opposed annular faces of the actuator disc segments and the adjacent end wall of the housing, in combination with resilient means yieldably interconnecting the actuator disc assembly and the housing for normally urging the actuator disc assembly axially away from the rotary friction disc.

6. A friction device as defined in claim 1, wherein the operating means between the free ends of the actuator disc segments comprises a rockable operator shaft extending through a clearance aperture in the end wall of the housing adjacent to the actuator disc assembly, and a rotary cam member operatively engaging the respective ends of the actuator disc segments, said cam member being fixed to the inner end of the rockable operator shaft.

7. A friction device as defined in claim 1, wherein the operating means between the free ends of the actuator disc segments comprises a rockable operator shaft extending through a clearance aperture in the end wall of the housing adjacent to the actuator disc assembly, a rotary cam member operatively engaging the respective ends of the actuator disc segments, said cam member being fixed to the inner end of the rockable operator shaft, and the respective free ends of the actuator disc segments each having a roller member carried thereby for operative engagement with the rotary cam member aforesaid.

8. A friction device as defined in claim 1, wherein the operating means between the free ends of the actuator disc segments comprises a rockable operator shaft extending through a clearance aperture in the end wall of the housing adjacent to the actuator disc assembly, a rotary cam member operatively engaging the respective ends of the actuator disc segments, said cam member being fixed to the inner end of the rockable operator shaft, the free end of each of the actuator disc segments being bifurcated and disposed in a position straddling the peripheral margin of the rotary cam member, and a roller member recessed within the bifurcated end of each segment and operatively engaging the peripheral edge of the cam member aforesaid.

9. A friction device as defined in claim 1, wherein the operating means between the free ends of the actuator disc segments comprises a rockable operator shaft extending through a clearance aperture in the end wall of the housing adjacent to the actuator disc assembly, a rotary cam member operatively engaging the respective ends of the actuator disc segments, said cam member being fixed to the inner end of the rockable operator shaft, said operator shaft being interrupted at a point intermediate its length to provide a pair of axially aligned shaft components, one of said components having a sleeve member fixed thereon and loosely embracing the other component, and the other component having a collar member fixed thereon adjacent to the sleeve aforesaid, said sleeve and collar members each having a radially outwardly extended lug, one of said lugs being axially extended into transversely opposed relation to the other lug, and an adjusting screw threadedly mounted in one of the lugs, with an end of said screw disposed for adjustable engagement with the other lug.

10. A friction device as defined in claim 1, wherein the operating means between the free ends of the actuator disc segments comprises a rockable operator shaft extending through a clearance aperture in the end wall of the housing adjacent to the actuator disc assembly, a rotary cam member operatively engaging the respective ends of the actuator disc segments, said cam member being fixed to the inner end of the rockable operator shaft, and means for rockably supporting the outer end of said operator shaft.

11. A friction device as defined in claim 1, wherein the operating means between the free ends of the actuator disc segments comprises a rockable operator shaft extending through a clearance aperture in the end wall of the housing adjacent to the actuator disc assembly, a rotary cam member operatively engaging the respective ends of the actuator disc segments, said cam member being fixed to the inner end of the rockable operator shaft, and means for rockably supporting the outer end of said operator shaft, said supporting means and the outer end of said shaft being pivotally connected together for universal movement of the operator shaft about its outer end.

12. A friction device as defined in claim 1, wherein the operating means between the free ends of the actuator disc segments comprises a hydraulic fluid motor operative on the segments to exert a spreading thrust on their free ends responsive to hydraulic energization of said motor.

13. A friction device as defined in claim 1, wherein the operating means between the free ends of the actuator disc segments comprises a double-acting hydraulic fluid motor fixed interiorly of and to said housing and having thrust means acting in opposite directions upon the respective free ends of said segments to spread the segments radially outwardly responsive to hydraulic energization of said motor.

14. A friction device as defined in claim 1, wherein the operating means between the free ends of the actuator disc segments comprises a double-acting hydraulic fluid motor fixed interiorly of and to said housing and having thrust means acting in opposite directions upon the respective free ends of said segments to spread the segments radially outwardly responsive to hydraulic energization of said motor, and resilient means yieldably interconnecting the free ends of said segments for normally urging said free ends toward each other and for retracting said thrust means on de-energization of said hydraulic motor.

15. A friction device as defined in claim 1, wherein the operating means between the free ends of the actuator disc segments comprises a double-acting hydraulic fluid motor fixed interiorly of and to said housing and having thrust means acting in opposite directions upon the respective free ends of said segments to spread the segments radially outwardly responsive to hydraulic energization of said motor, and adjuster means for automatically compensating for wear of the friction means, said adjuster means comprising a rigid link member loosely connected to the free end of each actuator disc segment, with the free ends of the respective link members being disposed in opposed alignment with each other and respectively having oppositely spiralled threads thereon, a nut member interconnecting the threaded ends of said link members and having corresponding oppositely spiralled threads extended from its respective ends interiorly of the same, and yieldable means engaging said nut member to restrain said nut member against rotation incident to the exertion of forces acting in one direction on the link members, while allowing automatic rotation of said nut member incident to the exertion of forces acting in the opposite direction on said link members.

16. A friction device as defined in claim 1, wherein the operating means between the free ends of the actuator disc segments comprises a double-acting hydraulic fluid motor fixed interiorly of and to said housing and having thrust means acting in opposite directions upon the respective free ends of said segments to spread the segments radially outwardly responsive to hydraulic energization of said motor, and adjuster means for automatically compensating for wear of the friction means, said adjuster means comprising a rigid link member loosely connected to the free end of each actuator disc segment, with the free ends of the respective link members being disposed in opposed alignment with each other and respectively having oppositely spiralled threads thereon, a nut member interconnecting the threaded ends of said link members and having corresponding oppositely spiralled threads extended from its respective ends interiorly of the same, and yieldable means engaging said nut member to restrain said nut member against rotation incident to the exertion of forces acting in one direction on the link members, while allowing automatic rotation of said nut member incident to the exertion of forces acting in the opposite direction on said link members, said yieldable means comprising a coiled spring anchored at its opposite ends to the respective link members and lying against the outer periphery of the nut member in frictional contact therewith.

17. A friction device as defined in claim 1, wherein a plurality of annular friction discs are disposed intermediate the actuator disc assembly and one end wall of the housing, certain of said friction discs being axially spaced and carried by a rotary hub member for rotation therewith, while being axially shiftable thereon, and with a stator disc disposed between the axially spaced rotary discs, said stator disc being axially shiftable in the housing while anchored against rotation relative thereto.

18. A friction device of the class described, comprising a housing having opposed axially spaced annular end walls, friction means in said housing including a rotary axially shiftable friction disc and a radially expandable actuator disc assembly, said actuator disc assembly being piloted on the housing and having limited compound radially expandable and axially shiftable movements relative thereto and relative to the rotary friction disc, camming means interposed between one end wall of the housing and said actuator disc assembly for effecting frictional interengagement of the friction means with each other and with the opposite end wall of the housing responsive to radial movement of the actuator disc assembly and consequent axial movement of said actuator disc assembly, and operating means cooperative with the actuator disc assembly for causing the limited radially expandable movement thereof.

19. A friction device as defined in claim 18, wherein the actuator disc assembly comprises a pair of semi-circular disc segments each having an end pivotally connected with an end of the other segment while leaving their opposite ends free to move toward and away from each other.

20. A friction device of the class described, comprising a fixed housing, rotatably and axially movable friction means in said housing, an axially movable and radially expandable actuator friction disc assembly disposed for limited compound radially expandable and rotative movements relative to said housing, common actuating and self-energizing camming means interposed between the housing and said actuator disc assembly for axially shifting said actuator disc assembly to initially effect frictional interengagement with the rotary friction means and with the housing and to subsequently effect self-energization of the friction device responsive to drag-torque-imparted relative rotation of the actuator disc assembly with respect to the housing, operating means coactively engaged with the actuator disc assembly to effect movement of the actuator disc assembly and the camming means relative to the housing, and resilient means normally urging the actuator disc assembly away from frictional interengagement with the friction means to provide a normal release clearance therebetween.

References Cited in the file of this patent

UNITED STATES PATENTS 2,526,143    Lambert _____ Oct. 17, 1950